US008401032B2

(12) United States Patent
Hundscheidt et al.

(10) Patent No.: US 8,401,032 B2
(45) Date of Patent: Mar. 19, 2013

(54) MULTI-USER MULTIMEDIA MESSAGING SERVICES

(75) Inventors: Frank Hundscheidt, Kerkrade (NL); Thorsten Lohmar, Aachen (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1361 days.

(21) Appl. No.: 10/513,532

(22) PCT Filed: May 6, 2003

(86) PCT No.: PCT/EP03/04731
§ 371 (c)(1),
(2), (4) Date: Nov. 5, 2004

(87) PCT Pub. No.: WO03/094534
PCT Pub. Date: Nov. 13, 2003

(65) Prior Publication Data
US 2005/0220064 A1     Oct. 6, 2005

(30) Foreign Application Priority Data

May 6, 2002   (EP) ..................................... 02010050

(51) Int. Cl.
*H04J 3/26* (2006.01)
(52) U.S. Cl. ........ 370/432; 370/352; 370/390; 370/392; 370/401; 370/437; 455/518; 455/519
(58) Field of Classification Search ................... 370/390, 370/389, 392, 351–352, 355, 400–401, 432, 370/437; 455/103, 500, 518, 519
See application file for complete search history.

(56) References Cited

U.S. PATENT DOCUMENTS
(Continued)

FOREIGN PATENT DOCUMENTS

| JP | A-2000-181836 A | 6/2000 |
| JP | A-2001-177566 A | 6/2001 |

(Continued)

OTHER PUBLICATIONS

Digital Cellular Telecommunications System (Phase 2+) (GSM); Universal Mobile Telecommunications System (UMTS); Multimedia Messaging Service (MMS); Functional Description; Stage 2 (3GPP TS 23.140 v. 4.6.0 Release 4); ETSI TS 123 140 v4.6.0. xx, xx, vol. V7.1.0. Mar. 2002, pp. 1-76, XP002224103; http://www.3gpp.org/ftp/Specs/archive/23_series/23.140/23140-460.zip.

(Continued)

*Primary Examiner* — Christopher Grey

(57) ABSTRACT

Methods, devices, and computer programs for improving the efficiency of multi-user multimedia messaging services are disclosed. A multimedia message is sent from an originator user device to an originator server and further to one or more recipient servers to which recipient user devices as addressed are associated to. The one or more recipient servers execute a multicast delivery for distributing the multimedia message to the recipient user devices and/or an improved reporting of a transmission state of the multimedia message by receiving status messages from the recipient user devices, each status message comprising an indication of an individual transmission state of the multi media message at one of the recipient user devices, aggregating the indications into a report representing the transmission state of the multimedia message, and sending the report to the originator server.

32 Claims, 5 Drawing Sheets

U.S. PATENT DOCUMENTS

| | | | |
|---|---|---|---|
| 5,928,331 A | | 7/1999 | Bushmitch |
| 6,085,101 A * | | 7/2000 | Jain et al. ................ 455/500 |
| 6,115,749 A * | | 9/2000 | Golestani et al. ............ 709/235 |
| 6,289,223 B1 | | 9/2001 | Mukherjee et al. |
| 6,298,058 B1 * | | 10/2001 | Maher et al. ................ 370/390 |
| 6,728,775 B1 * | | 4/2004 | Chaddha ................ 709/231 |
| 7,031,326 B1 * | | 4/2006 | Shur et al. ................ 370/401 |
| 7,088,736 B2 * | | 8/2006 | Altenbernd et al. ......... 370/468 |
| 7,117,273 B1 * | | 10/2006 | O'Toole et al. ............. 709/252 |
| 7,133,371 B2 * | | 11/2006 | Helm et al. ................ 370/270 |
| 7,133,928 B2 * | | 11/2006 | McCanne ................ 709/238 |
| 7,190,680 B2 * | | 3/2007 | Lim ................ 370/312 |
| 7,298,508 B2 * | | 11/2007 | Furukawa et al. ........... 358/1.15 |
| 7,535,903 B1 * | | 5/2009 | Patel ................ 370/390 |
| 2003/0031175 A1 * | | 2/2003 | Hayashi et al. ............. 370/390 |
| 2003/0061368 A1 * | | 3/2003 | Chaddha ................ 709/231 |
| 2005/0100016 A1 * | | 5/2005 | Miller et al. ................ 370/390 |
| 2006/0039388 A1 * | | 2/2006 | Shur et al. ................ 370/401 |

FOREIGN PATENT DOCUMENTS

| | | | |
|---|---|---|---|
| JP | 2001-345807 | | 12/2001 |
| JP | 2002-335281 | | 11/2002 |
| WO | WO 0211398 | | 2/2002 |
| WO | WO 0211398 A | | 2/2002 |
| WO | WO 0217658 | * | 2/2002 |
| WO | WO 02 063849 A | | 8/2002 |
| WO | WO 02063849 | | 8/2002 |
| WO | WO 03/030453 A2 | | 10/2002 |

OTHER PUBLICATIONS

"Digital Cellular Telecommunications System (Phase 2+) (GSM); Universal Mobile Telecommunications System (UMTS); Multimedia Messaging Service (MMS); Functional description; Stage 2 (3 GPP TS 23.140 version 4.6.0 Release 4)" vol. V7.1.0, Mar. 2002, pp. 1-76, XP002224103.

Lin Y-B: "A Multicast Mechanism for Mobile Networks" IEEE Communications Letters, IEEE Service Center, Piscataway, US, US, vol. 5, No. 11, Nov. 2001, pp. 450-452, XP001077407, ISSN: 1089-7798, paragraph, 0001.

European Patent Office, International Search Report for PCT/EP0304731, dated Sep. 30, 2003.

Sugisono, et al "Network Design for Streaming Service on IP Multicast over ATM". The Transactions of the Institute of Electronics, Information and Communication Engineers, vol. J84-B, No. 5, pp. 893-901, May 1, 2001.

* cited by examiner

MULTI-USER MULTIMEDIA MESSAGING SERVICES

TECHNICAL FIELD OF THE INVENTION

The present invention relates to the field of mobile communication networks, especially to a method and devices for optimizing multi-user multimedia messaging services.

BACKGROUND OF THE INVENTION

Short Message Service (SMS) has been very successful in the Global System for Mobile communication (GSM) second generation (2G) system, wherein it is possible to execute non realtime text transmission by means of GSM terminals, e.g. from an internet computer terminal to a mobile phone or from one mobile phone to another. This easy to use service for non realtime text transmission shall be succeeded to in 2.5G and third generation (3G) mobile systems by a non real-time Multimedia Message Service (MMS). With MMS, users are allowed to send and receive Multimedia Messages (MM) exploiting the whole array of media types available today e.g. text, images, audio, video while also making it possible to support new content types as they become popular.

A non-realtime MM, or otherwise called store and forward MM, is a combination of one or more different media elements in a multimedia presentation that can be transferred between devices of users without the requirement for the need to be transferred in realtime. The non-real-time multimedia messaging service shall be capable of supporting current and future multimedia messaging services, and exploit the advances being made in the world multimedia community, with additional mobile requirements.

$3^{rd}$ Generation Partnership Project (3GPP) Technical Specification 22.140 V4.2.0 (2002-03) and 3GPP Technical Specification 23.140 V4.6.0 (2002-03) describe the current state of standardization activities for MMS. For sending a MM from an originator to a recipient, the following procedure can be used: A user agent (UA), i.e. an application residing on the originator's User Equipment (UE) or a device attachable to the UE of the originator sends the MM comprising multimedia content and an address of the recipient to an originator MMS Relay/Server (R/S). The originator MMS R/S forwards the MM content to a recipient MMS R/S that subsequently notifies an UA residing on the UE of the recipient. The notification does not contain the MM but a reference to the actual MM. The reception of the MM notice is acknowledged by the recipient MMS UA to the recipient MMS R/S and the MM can then be retrieved by the recipient MMS UA. The retrieval of the MM and the reading of the MM by the UA of the recipient are acknowledged to the recipient MMS R/S. A MM delivery report comprising an identification of the original MM, the recipient address, time stamping, and the delivery status can be generated by the recipient MMS R/S and sent to the originator MMS R/S. The originator MM R/S can send the delivery report to the originator MMS UA, e.g. for indication of the delivery of the MM to the originator MMS UA. A similar procedure is described for sending a read reply report that is generated at the recipient MMS R/S when the MM is read by the recipient.

Sending a MM from one originating UA to multiple recipient MMS UAs is possible. One alternative is to address the MM to multiple recipient MMS UAs and to perform MM replication right at the originating MMS UA. Another alternative is to send the MM and the addresses of the multiple recipient MMS UAs from the originator MMS UA to the originator MMS R/S. Replication of the MM is executed at the originator MMS R/S even for recipient MMS UAs that are served by the same recipient MMS R/S. The procedure continues as described before for sending the replicated MMs to one or more recipient MMS R/S that subsequently notify the recipient MM UAs for retrieval of the MM. Both procedures are similar to email distribution to a number of receivers. Either the entire list of receivers is included and multiple emails are send to each of the receivers or a list-server like majordomo is used. A list server maintains lists of addresses of users subscribed to one or more groups. Each group can be identified by a group address. An email addressed to one of the groups comprises the corresponding group address on base of that and the corresponding list the list-server can retrieve the corresponding user addresses. A copy of the email is sent to each of the corresponding user addresses.

The aforementioned procedures are not very efficient. In the case of MM delivery to multiple recipient MMS UAs, the notification and then the recipient MMS UA triggered retrieval sequence becomes a limitation. In the case a large number of recipients UAs gets a notification for the same MM, the probability is rather high that all or a high fraction of the recipient MMS UAs initiate the retrieval of the MM immediately after the reception of the notification. In this situation, the recipient MMS R/S sends per recipient MMS UA that requests a retrieval of the MM, a message for retrieval comprising the MM leading to high load of the recipient MMS R/S and possibly even congestion of the network, especially on the scarce and expensive radio networks between the recipient MMS R/S and the recipient MMS UAs. In addition, acknowledgements of the retrieval or read replies sent from the recipient MMS UAs that have received the MM and read the MM, respectively, initiate the generation of delivery and read-reply reports, respectively, with the number of delivery or read reply reports amounts to the number of recipients UAs that have received and read the MM, respectively. The reports can be further sent to the originator MMS R/S and to the originator MMS UA leading to congestion of the network between those entities and overload of the entities themselves.

A so-called MM1_submit.REQ message comprising addresses and a MM sent from the originator MMS UA to the originator MMS R/S contains flags to indicate whether a delivery report, reply-charging and read reply is requested. However, these are simple yes/no flags without any granularity indications on how the originator MMS UA would like to receive the report. Especially, there is currently no way to control the amount of delivery reports and read reply reports to the originator MM R/S and originator MMS UA triggered by acknowledgements and read-reply messages by the recipient MMS UAs to the recipient MMS R/S. Especially in the case of multiple recipients, the amount of acknowledgements and reports and the messaging needed for transmitting the acknowledgements and reports can lead to a high load of the network entities involved resulting in overload situations or performance reductions.

SUMMARY OF THE INVENTION

It is an object of the present invention to provide methods, devices and computer programs that improve the efficiency of multimedia message services with respect to the delivery and/or reports of multimedia messages.

This object is achieved by the method, recipient server, and computer program as recited in the claims herein.

A method for efficient transmission of a multimedia message from an originator user device to recipient user devices is disclosed. The method comprises several steps. In a first step, a first message is sent from the originator user device to an originator server. The first message comprises the multimedia message and an indication of addresses of the recipient user devices. Examples for an indication of addresses are a group address of the recipient user devices or a list comprising the addresses of the recipient user devices or a combination thereof.

In a second step, an identifying of a recipient server associated to the recipient user devices based on the indication of the addresses is executed. This step can include the resolving of a group address. Next, after identifying the recipient server the addressed recipient user devices are associated to, the first message is sent to the identified recipient server. In a following step, the recipient user devices are identified on the base of the indication of the addresses, e.g. by resolving a group address into the addresses of the individual recipient user devices. Furthermore, a multicast delivery of the multimedia message to the recipient user devices is executed.

The method improves the efficiency of multimedia message services with respect to the delivery of multimedia messages to recipient user devices due to the fact that a multicast delivery of the multimedia message to the recipient user devices is executed. The transmission of the multimedia message by multicast is advantageous over unicast transmission, because the messaging and processing effort for the distribution of the multimedia message to the recipient user devices is reduced. With unicast transmission, the recipient server has to send each of the recipient user devices a separate message. According to multicast, the multimedia message can be send from the recipient server in a single message which can be replicated close to the recipient user devices for delivery thus reducing messaging and processing effort of the recipient server as well as of possible network entities between the recipient server and the recipient user devices for the multicast delivery. Further efficiency is gained by the usage of one or more group addresses for indication of addresses which is favorable compared to a list of individual addresses especially for a large number of recipients as group addressing avoids to send many addresses in a message. With one or more group addresses, the first message can get shorter thus reducing network load and processing effort of the entities handling by the first message.

The multicast delivery can comprise the steps of allocating a multicast address, sending the multicast address to the recipient user devices, embedding the multimedia message in an object suitable for a multicast transmission, preparing by the recipient user devices for a reception of the object, joining by the recipient user devices a multicast group according to the multicast address, and sending the object via the multicast transmission to the recipient user devices. The joining step may be part of the preparing step or may be executed separately.

According to a preferred embodiment, the execution of the multicast delivery can be based on the number of recipient user devices, e.g. by checking a threshold value that when being exceeded by the number of recipient user devices triggering the recipient server to proceed with a multicast delivery of the multimedia message.

According to another preferred embodiment, the recipient user devices can receive in conjunction with the multicast address at least one item from a group comprising a description of an error protection scheme, a time window, a transaction key, charging information, an Uniform Resource Locator, an Uniform Resource Indicator, a logical name of a multicast group connected to the multicast address, a transmission start time, and a number of transmissions.

According to another preferred embodiment, at least one of the originator server and the recipient server can resolve the addresses of the recipient user devices from the indication of addresses. Resolving the addresses is necessary in case a group address is used for the indication of addresses. The resolving may be executed by one of the servers or on behalf of the servers at a further entity providing a resolving service.

The recipient user devices can be associated to more than one recipient server being identified based on the indication of the addresses. In this case, the first message can be sent to the more than one recipient server. Each of the more than one identified recipient servers can identify its associated recipient user devices, e.g. on the base of the indication of addresses comprised in the first message. Furthermore, each of the identified recipient servers that received the first message can execute a multicast delivery of the multimedia message to its associated recipient user devices.

A method for efficient reporting of a transmission state of a multimedia message addressed to recipient user devices is disclosed. The method comprises several steps. In a first step, a multimedia message from an originator server is received at a recipient server. The recipient server can identify the recipient user devices to which the multimedia message is addressed to and which are associated to the recipient server. In a next step, the multimedia message can be sent from the recipient server to the addressed recipient user devices associated to the recipient server. Furthermore, the recipient server can receive status messages each comprising an indication of an individual transmission state of the multimedia message at one of the recipient user devices. Examples for the indications for the individual transmission state comprise at least one item from a group comprising an acknowledgement of a notification about the multimedia message, an acknowledgement of a delivery of the multimedia message, and an acknowledgement of a reading of the multimedia message. The received indications can be aggregated into a report representing the transmission state of the multimedia message, e.g. a report comprising delivery and read acknowledgements received from the recipient user devices in an aggregated way. Furthermore, the report can be sent to the originator server.

The method improves the efficiency of multimedia message services with respect to the reporting of a transmission state of a multimedia message addressed to multiple recipient user devices. The reporting of information in an aggregated way is much more efficient than executing a reporting by sending individual messages comprising each an individual transmission state of an addressed recipient user device. Less messages can be used for aggregated reporting which results in a lower network load and reduced processing effort for the recipient server and the originator server compared to state of the art solutions. Furthermore, reporting in an aggregated way typically provides a more adequate overview on the transmission state compared to individual information which can enable a faster analysis of the transmission state.

The multimedia message can be received from an originator user device. The report received by the originator server can be sent to the originator user device for reporting to the originator user device the transmission state of the multimedia message.

According to a preferred embodiment, the indications are compiled according to a request. The request can e.g. originate from at least one entity from a group comprising the originator user device, the originator server, and the recipient server. The compiled indications can be aggregated according to the invention. The request can be modifiable or one or more requests can be added to the request, e.g. by the recipient server and/or the originator server.

According to a preferred embodiment, those of the status messages are used for the report that are received within a time interval. Collecting status messages like acknowledgements within a time interval may avoid long response times for the reporting.

According to another preferred embodiment, one or more of the indications are relatable to one or more addresses of the recipient user devices and the report comprises the one or more addresses related to the transmission state. Reporting one or more addresses related to the transmission state of the multimedia message provides further information that can be further used, e.g. a recipient user device having not received the multimedia message can be addressed once more for sending the multimedia message.

According to another preferred embodiment, the report can be processed for statistical and/or charging purposes.

The recipient user devices can be associated to more than one recipient server. In this case, the originator server can send the multimedia message to the more than one recipient server and can receive more than one report each representing the transmission state of the multimedia message related to the respective recipient server. For reporting of the transmission state of the multimedia message, the originator server can aggregate the more than one reports into a further report representing the transmission state of the multimedia message.

The originator user device can comprise an originator multimedia message service user agent. The originator user device may be a user equipment like a mobile phone or a server having access to a multimedia message service for executing the steps of the method as far as related to the originator user device.

The recipient user devices can comprise each a recipient multimedia message service user agent. Correspondingly, a recipient user device may be a user equipment like a mobile phone or a server having access to a multimedia message service for executing the steps of the method as far as related to the recipient user device.

The originator server can be an originator multimedia message service relay server and/or the recipient server can be a recipient multimedia message service relay server. The originator server and the one or more recipient servers can be realized on separate or one or more common platforms.

One or more of the steps of the method for efficient transmission of a multimedia message from an originator user device to recipient user devices and of the method for efficient reporting of information about a transmission state of the multimedia message addressed to the multiple recipient user devices can be combined. The combination further increases the efficiency as a multimedia message service benefits from the reduced messaging and processing effort associated with both, the multicast delivery and improved reporting.

The invention is embodied in devices like a recipient server, an originator server, and a originator user device that are explained in more detail in the following.

A recipient server for efficient transmission of a multimedia message to recipient user devices is disclosed. The recipient server comprises a receiving unit for receiving messages, a transmission unit for sending messages, and a processing unit for processing messages and information. The receiving unit is adapted to receive a first message comprising the multimedia message and an indication of addresses of the recipient user devices. The processing unit is adapted to identify the recipient user devices based on the indication of the addresses. Furthermore, the recipient server is adapted to execute a multicast delivery of the multicast message to the recipient user devices, wherein the processing unit is adapted to execute an allocation of a multicast address, the transmission unit is adapted to send the multicast address to the recipient user devices, the processing unit is adapted to embed the multimedia message in an object suitable for a multicast transmission, and the transmission unit is adapted to send the object via the multicast transmission to the recipient user devices.

According to a preferred embodiment, the processing unit of the recipient server can be adapted to base the execution of the multicast delivery on the number of recipient user devices, e.g. by making an appropriate decision for multicast 30 delivery when the number of recipient user devices exceeds a threshold value. The recipient server can be adapted to send in conjunction with the multicast address at least one item from a group comprising a description of an error protection scheme, a time window, a transaction key, charging information, an Uniform Resource Locator, an Uniform Resource Indicator, a logical name of a multicast group connected to the multicast address, a transmission start time, and a number of transmission.

The processing unit of the recipient server can be adapted to resolve the addresses of the recipient user devices from the indication of addresses.

A recipient server for efficient reporting of a transmission state of a multimedia message addressed to recipient user devices is disclosed. The recipient server comprises a receiving unit for receiving messages, a transmission unit for sending messages, and a processing unit for processing messages and information. The receiving unit is adapted to receive from an originator server the multimedia message. The transmission unit is adapted to send the multimedia message to the addressed recipient user devices associated to the recipient server. The receiving unit is adapted to receive status messages each comprising an indication of an individual transmission state of the multimedia message at one of the recipient user devices. The processing unit is adapted to aggregate the indications into a report representing the transmission state of the multimedia message. Furthermore, the transmission unit is adapted to send the report to the originator server.

According to a preferred embodiment of the recipient server, the processing unit can be adapted to compile the indications according to a request originating from at least one entity from a group comprising an originator user device, the originator server, and the recipient server and to aggregate the compiled indications.

The processing unit of the recipient server can be adapted to modify the request and to compile the indications according to the modified request. In addition or alternatively, the processing unit may be adapted to add one or more requests and to compile the indications according to the added one or more requests.

According to another preferred embodiment, the processing unit of the recipient server can be adapted to use those of the status messages for the report that are received within a time interval.

According to another preferred embodiment, the processing unit of the recipient server can be adapted to relate one or more of the indications to one or more addresses of the recipient user devices and to relate the one or more addresses to the transmission state in the report.

According to another preferred embodiment, the processing unit of the recipient server can be adapted to process the report for statistical and/or charging purposes.

One or more functionalities of the recipient server as disclosed for efficient transmission of a multimedia message from an originator user device to recipient user devices and for efficient reporting of a transmission state of a multimedia message addressed to recipient user devices can be preferably combined thus further increasing the efficiency of the multimedia messaging service due to the fact that the recipient server with combined functionality is adapted to execute a multicast delivery and an improved reporting according to the invention.

An originator server for efficient reporting of a transmission state of a multimedia message addressed to recipient user devices is disclosed. The originator server comprises a receiving unit for receiving messages, a transmission unit for sending messages, and a processing unit for processing messages and information. The transmission unit is adapted to send the multimedia message to more than one recipient server the addressed recipient user devices are associated to. The receiving unit is adapted to receive reports from the more than one recipient server. Each of the received reports represents a transmission state of the multimedia message related to the respective recipient server from which the respective report is received. The processing unit is adapted to aggregate the received reports into a further report representing the transmission state of the multimedia message.

The multimedia message can be received from an originator user device and the transmission unit of the originator server can be adapted to send the further report to the originator user device.

The processing unit of the originator server can be adapted to execute at least one item from a group comprising a compilation of the received reports according to a request, a modification of a request, and an adding of a request.

The processing unit of the originator server can be preferably adapted to process at least one of the reports and the further report for statistical and/or charging purposes.

An originator user device for efficient reporting of a transmission state of a multimedia message addressed to recipient user devices is disclosed. The originator user device comprises a receiving unit for receiving messages, a transmission unit for sending messages, and a processing unit for processing messages and information. The processing unit is adapted to generate a request for a report according to a selection by a user of the originator user device. The request comprises one or more indicators for a compilation to determine the transmission state in an aggregated way according to the one or more indicators for the compilation. The transmission unit is adapted to send the request and the multimedia message to an originator server. Furthermore, the receiving unit is adapted to receive the report from the originator server according to the request. The received report comprises the determined transmission state, i.e. as compiled according the one or more indicators in an aggregated way.

The proposed method is embodied also in computer programs to execute steps of the proposed method. The computer programs comprise portions of software codes in order to implement the method as described. One or more of the computer programs can be stored on one or more computer readable media. A computer-readable medium can be a permanent or rewritable memory within a device like a user equipment or a server or can be located externally. One or more of the computer programs can be transferred to a device for example via a cable or a wireless link as a sequence of signals.

A computer program loadable into a processing unit of a recipient server is disclosed. The computer program comprises code adapted to execute any step of the method according to any of the claims 1 to 19 as far as related to the recipient server.

A computer program loadable into a processing unit of an originator server is disclosed. The computer program comprises code adapted to execute any step of the method according to any of the claims 1 to 19 as far as related to the originator server.

A computer program for efficient reporting of a transmission state of a multimedia message addressed to recipient user devices is disclosed. The computer program is loadable into a processing unit of an originator user device comprising e.g. a originator multimedia message user agent. The computer program comprises code adapted to generate a request for a report according to a selection by a user of the originator user device, the request comprising one or more indicators for a compilation to determine the transmission state in an aggregated way according to the one or more indicators for the compilation, and comprises code to effect a sending of the request and the multimedia message to an originator server, and comprises code adapted to process the report received from the originator server according to the request, the received report comprising the determined transmission state.

In the following, detailed embodiments of the present invention are described with reference to the figures.

DETAILED DESCRIPTION OF THE INVENTION

Figure 1:
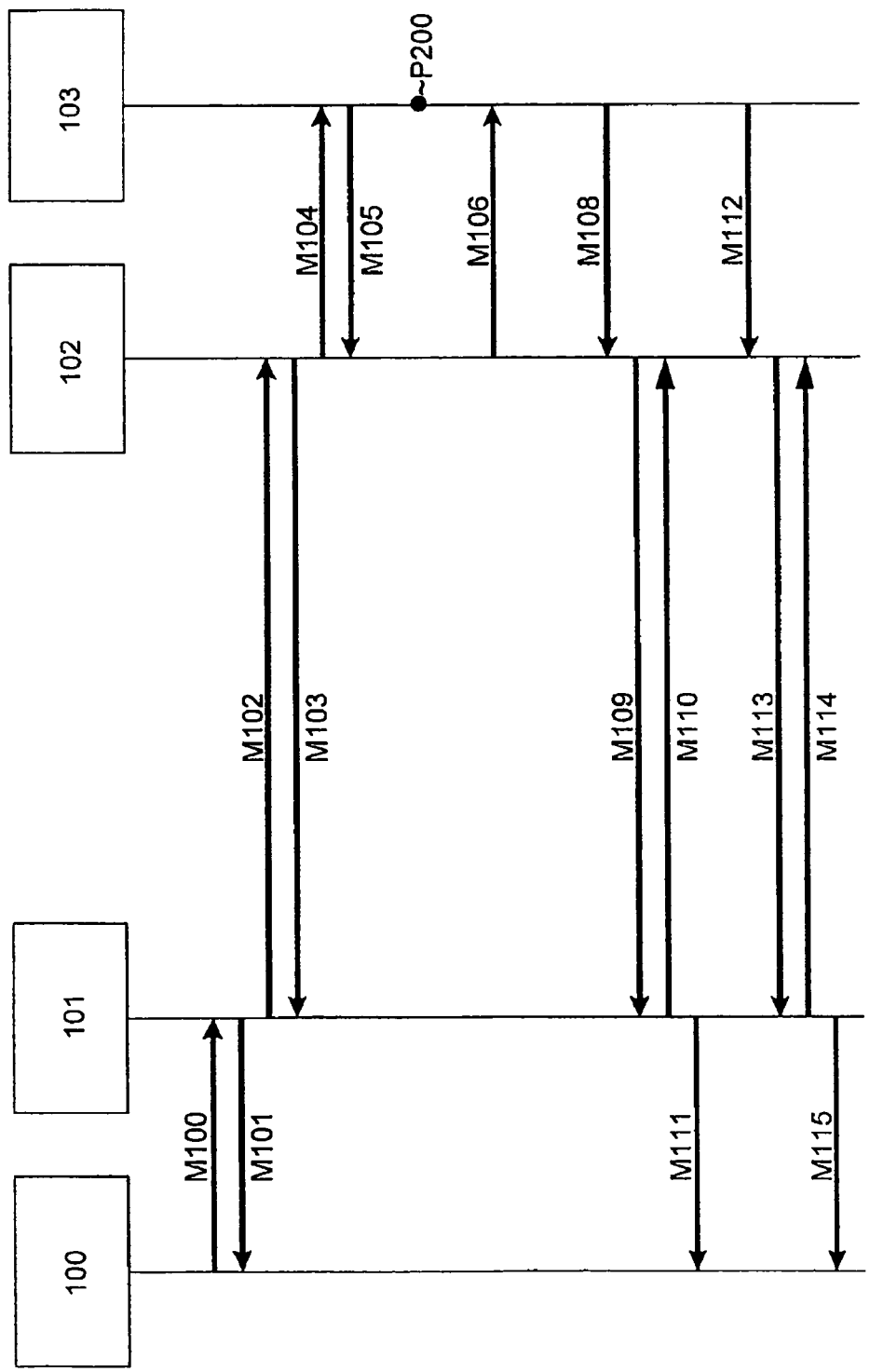
FIG. 1 shows a message flow for MM delivery via multicast.

FIG. 1 shows a first embodiment for an optimized MMS using multicast transmission technology for delivery of a MM. To gain from multicast transport efficiency, a MM is preferably destined to a large number of recipients. There are different mechanisms to identify a MM for larger recipient groups. The mechanisms are based on group addresses instead of individual addresses (e.g. phone number). Examples are email distribution lists, majordomo lists, or by a dedicated indication in the MM or a message carrying the MM. Most efficient is any kind of delivery optimization, e.g. by using common radio channels, when a number of recipients are in the same geographical area.

A group address or group identifier like a name of a group can be included into a MM1_Submit.REQ message M100 for indicating a group of users associated to multiple recipient MMS R/Ss, to the originator MMS R/S 101 where the MM1_Submit.REQ message M100 is sent from the originator MMS UA 100 to the originator MMS R/S 101. In the following, group address and group identifier are used synonymously for indicating a group. A group address can be entered by a user of the UE with the originator MMS UA 100. Thus, using group addressing and sending mechanisms for multimedia messages renders the method simple and convenient for the end-user as he is freed from the burden to enter all individual addresses as according to state of the art MM solutions. Alternatively, the addresses of the multiple recipients may be entered into the MM1_Submit.REQ message M100.

The MM1_Submit.REQ message M100 comprises in addition the MM for the multiple recipients. The reception of the MM1_Submit.REQ message M100 can be acknowledged by the originator MMS R/S 101 to the originator MMS UA 100, e.g. by MM1_submit.RES message M101. The originator MMS R/S 101 identifies the recipient MMS R/S 102 and sends the MM and the group address to the recipient MMS R/S 102 by a MM4_forward.REQ message M102 which reception can be acknowledged by the recipient MMS R/S 102 to the originator MMS R/S 101 via MM4_forward.RES message M103. In case the recipient MMS R/S 102 cannot handle group MMs, i.e. a MM accompanied by a group address, the originator MMS R/S 101 can resolve the addresses of the recipient MMS UAs and forwards the MM and the addresses to the recipient MMS R/S 102 by a MM4_forward.REQ message M102 thus ensuring backward compatibility. Correspondingly, the reception of the MM4_forward.REQ message M102 can be acknowledged by the recipient MMS R/S 102 to the originator MMS R/S 101 via MM4_forward.RES message M103. If the recipient MMS UAs are served by multiple recipient MMS R/Ss, corresponding MM4_forward.REQ messages and MM4_forward.RES messages to and from, respectively, each of the multiple recipient MMS R/Ss can be sent. Preferably, the originator MMS R/S 101 identifies one or more recipient MMS R/Ss the recipient MMS UAs are associated to from the address field of the MM1_Submit.REQ message M100 and sends a copy of the MM and one or more recipient group addresses to each of the one or more recipient MMS R/Ss.

Each of the one or more recipient MMS R/Ss can resolve its recipient group address to the individual addresses of the recipient MMS UAs. There are two alternatives to resolve the individual receiver addresses: A first alternative is, that a group resolution server, which resolves the group address or group address to the individual addresses is available in the network. Beside the group address associated to the MM an indication may indicate a resolution server to the recipient MMS R/S for resolving of the addresses from the group address, e.g. an address of a majordomo list server which resolves the addresses according to the group address and delivers the addresses to the one or more recipient MMS R/Ss. The second alternative is, that the MM or one or more of the messages comprising the MM contains a list of receivers beside the group address. The group address is used to differentiate between different groups and to indicate group MMs. This also avoids any additional group server. The resolving of addresses at the one or more recipient MMS R/Ss is preferable for large user groups, e.g. 10.000 recipient MMS UAs, thus avoiding the sending of many addresses of the recipient MMS UAs from the originator MMS R/S to the one or more recipient MMS R/Ss thus reducing network load due to shorter messages and processing effort at the originator and recipient MMS R/Ss.

To offer efficient delivery of the MM to the receiving UAs, the Multimedia Broadcast/Multicast Service (MBMS) multicast mode is used. MBMS is currently standardised in 3GPP and specified in TS 22.146 and TR 23.846 (see 3GPP TS 22.146 V5.2.0 (2002-03) and 3GPP TR 23.846 0.3.0 (2002-01), respectively). To offer multicast based MMS delivery, the recipient MMS R/S 102 allocates a multicast address. An Internet Protocol (IP) multicast address identifies an entire group of interfaces, instead of only one. Internet Group Multicast Protocol (IGMP) (see IETF RFC2236) in case of IPv4 and Multicast Listener Discovery (MLD) (see IETF RFC2710) in case of IPv6 is used for the group management. Efficient transmission of IP datagrams is possible, since only one copy of a packet is sent and the packet is replicated close to the receivers.

The MM is embedded into an object and is pushed using User Datagram Protocol (UDP) transmission protocol to the recipient MMS UAs. The process of "embedding" is necessary to use a transport protocol for further forwarding the MM for multicast data delivery as explained in the following. This process can include the segmentation of a large MM into smaller fragments. In addition or alternatively, the process can include adding of redundancy for error correction and error detection. This process is very similar to preparing web pages for broadcast distribution like in Digital Video Broadcasting-Terrestic (DVB-T). To increase reliability, a data carousel approach is used for Web-Page broadcast in DVB-T and this approach can be similarly applied to multicast delivery of a MM. A further protocol example suitable for multicast transmission is the Broadcast Trivial File Transfer Protocol (BTFTP).

This object, which contains the MM, is called also sometimes "push object" in the following description. All recipient MMS UAs that do not receive the push object can retrieve the MM from the recipient MMS R/S 102 using the procedure according to state of the art as explained in conjunction with FIG. 2 in more detail.

Figure 2:
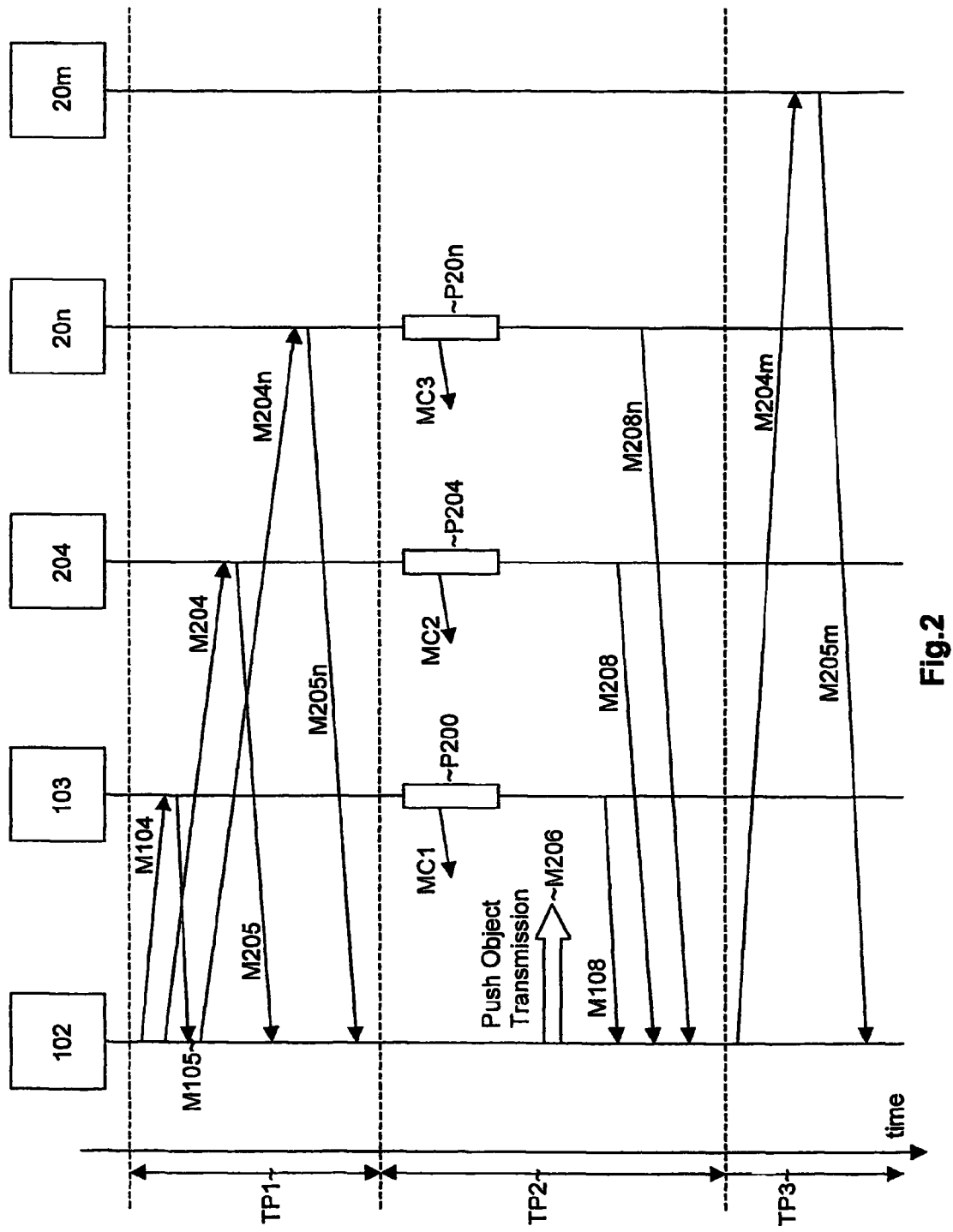
FIG. 2 shows a message flow for multicast MM delivery to multiple recipient MMS UAs.

While FIG. 1 shows only one recipient MMS UA 103, FIG. 2 illustrates an extension showing multiple recipient MMS UAs 103,204,20$n$,20$m$. Relevant steps of both FIGS. 1 and 2 are therefore described and referenced in parallel. FIG. 2, in addition, discloses an indication of a time scale which is subdivided in three main time periods TP1,TP2,TP3. A first, initial period can be given by the transmission of MM1_notification.REQ messages M104,M204,M204$n$ from the recipient MMS R/S 102 to the recipient MMS UAs 103, 204,20$n$ and the subsequent acknowledgement of the reception of the MM1_notification.REQ M104,M204,M204$n$ messages by MM1_notification.RES messages M105,M205, M205$n$ from the recipient MMS UAs 103,204,20$n$ to the recipient MMS R/S 102.

The multicast address is contained in the MM1_notification.REQ messages M104,M204,M204$n$ which are sent from the recipient MMS R/S 102 to the recipient MMS UAs 103,204,20$n$. A MM1_notification.REQ message to recipient MMS UA 20$m$ is not shown in FIG. 2 in the initial time period TP1. It may happen that not all recipient MMS UAs receive the MM1_notification.REQ messages, e.g. because not all mobile terminals are on-line or the transmission is disturbed. For example according to FIG. 2, a mobile terminal carrying the recipient MMS UA 20$m$ may miss the MM1_notification.REQ message sent to said mobile terminal. The sending of a MM1_notification.REQ message to a recipient MMS UA may be not executed if the UE carrying said recipient MMS UA is offline.

The MM1_notification messages M104, M204, M204$n$ comprise the Multicast Address and Port and can be can be enhanced by the following options. A first option is the utilization of an error protection scheme. A description of one or more error protection schemes may be included into the MM1_notification messages M104, M204, M204$n$. There are different ways to protect a multicast push object against corruption.

Erasure Codes (e.g. Reed-Solomon) wherein Redundancy is added to the actual object, which allows identifying or correcting word errors can be used for example. A word may be also one single bit or a number of bits, e.g. a byte. DigitalFountain [ref: J. W. Byers, M. Luby, M. Mitzenmacher, A. Rege, A Digital Fountain Approach to Reliable Distribution of Bulk Data, in Proc. ACM SIGCOMM'98, September 1998] mechanism also adds redundancy to the original object. Carousels or Broadcast Disks for periodic transmission of the object can be utilized. If a word or fragment is missing, the recipient MMS UA waits for the next cycle. The number of cycles is limited in this scenario. Also combinations of the aforementioned mechanisms may be applied in order to further protect the MMS against errors.

In FIG. 2, a second time period TP2 in which the recipient MMS UAs join the multicast group, prepare themselves for reception of the MM, receive and acknowledge the reception of the MM is depicted. Thus, a further option for enhancing the MM1_notification messages is an indication of a time-window like the time period TP2 during which the Push object is transmitted on the multicast channel. The Push object is not transmitted for an infinite time on the multicast group. The Time-Window is not limited to a single push-object transmission period, since cyclic repetitions are possible, e.g. by data carousel or broadcast-disk. The time period TP2 as an example for a time window may be indicated by a start time of the transmission and number of times the same MM will be distributed or by a start and stop time of the transmission.

Furthermore, an MM1_notification message can be enhanced by including a transaction key to protect against eavesdropping. In case such a notification message is transmitted via a unicast bearer, a simple mechanism like an indication of a channel via which the MM is to be distributed to the recipient MMS UAs and of the start time of the transmission may be sufficient. The indication may be not but the content may be encrypted. The decryption key can be sent via the notification message, i.e. MM1_notification.REQ messages M104,M204,M204n according to FIG. 2. Optionally, Digital Rights management information, e.g. a rights object, can be distributed in the notification message or together with the content itself via multicast transport.

Further examples for the enhancement are charging information, a Uniform Resource Locator (URL)/Unified Resource Indicator (URI) for an individual, e.g. more reliable but possibly also more expensive, MMS content retrieval, and a logical name for the group (connected to multicast address) in order to have more convenient display for the clients. As an example for a logical name: A typical IP multicast address is 224.2.4.3. This group might be used for Grand Prix related information. A logical name would be "GrandPrix" associated to the IP address 224.2.4.3. The transmission channel used for the multicast transmission is described by the multicast group and thus by the multicast address.

The recipient MMS UAs 103,204,20n having received the MM1_notification.REQ messages M104,M204,M204n within the initial time period TP1 join in processes P200, P204,P20n a multicast group and prepare in processes P200, P204,P20n for receiving of the push object. The multicast group can be joined based on the multicast address comprised in the MM1_notification.REQ message. A recipient MMS UA can join the multicast group by sending a message like an IGMP or MLD message to an entity like a Gateway GPRS Support Node (GGSN) that controls a bearer like a MBMS bearer suitable for multicast MM delivery. According to the present example, recipient MMS UAs 103,204,20n send the messages MC1,MC2,MC3 being e.g. IGMP or MLD messages to a GGSN (not shown in FIG. 2) to join in processes P200,P204,P20n the multicast group. For preparing of the reception of the push object, e.g. a channel for receiving the push object can be adjusted. Alternatively or in addition, an encryption, codec, and/or bitrate can be adapted. Furthermore, memory may be reserved for storing or processing the MM on the recipients' UEs.

The receipt of the MM1_notification.REQ messages M104,M204,M204n can be acknowledged to the recipient MMS R/S 102 by MM1_notification.RES messages M105, M205,M205n. Via multicast data delivery the push object is transmitted M206 to the recipient MMS UAs; 103;204;20n.

To increase correct reception probability, the push object can be transmitted several times using a data carousel as explained before.

The reception of the push object can be acknowledged by MM1_acknowledgement.REQ messages M108,M208, M208n.

For those recipient MMS UAs that miss the push object or the MM1_notification.REQ messages M104, e.g. due to the fact that the push window was missed or because of a corrupted transmission, or for recipient MMS UAs that are offline, the normal retrieval procedure according to state of the art can be used for retrieval of the MM. According to FIG. 2, the recipient MMS UA 20m e.g. being offline, can be notified by a MM1_notification.REQ message M204m in time period TP3 when being reachable again. The MMS UA 20m can acknowledge the reception of the notification message M204m by a MM1.notification.RES message M205 and can subsequently retrieve the MM from the recipient MMS R/S 102. Alternatively, the multicast delivery may be repeated, which is preferably done if a larger fraction of the recipient MMS UAs have missed the initial MM1_notification.REQ messages.

Figure 3:
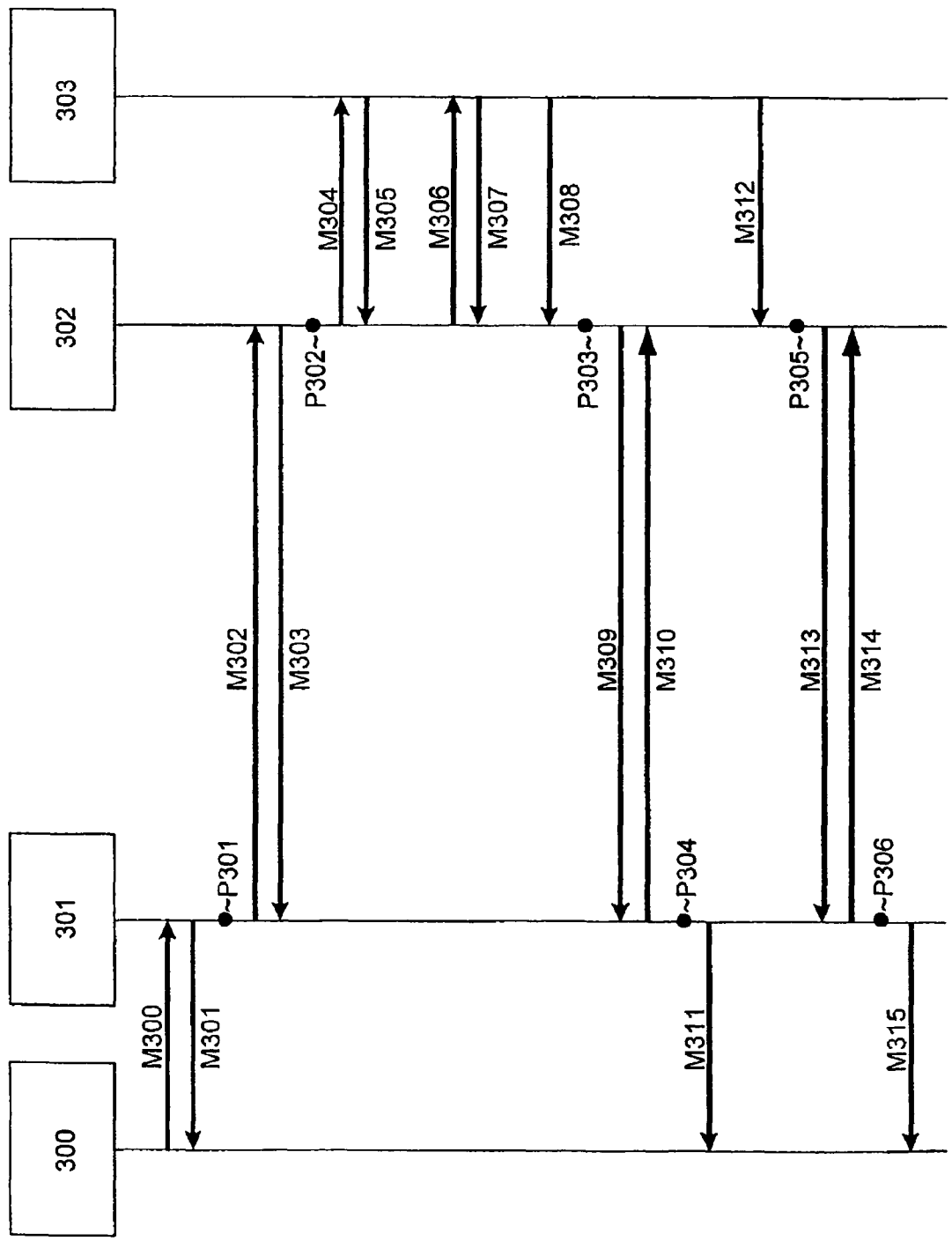
FIG. 3 shows a message flow for a MMS with optimized acknowledgement and reporting.

A reporting of the transmission state of multimedia message and acknowledging of reports can be executed as indicated in FIG. 1 according to state of the art by
MM1_acknowledgement.REQ message M108,
MM4_delivery_report.REQ message M109,
MM4_delivery_report.RES message M110,
MM1_delivery.report.REQ message M111,
MM1_read_reply_recipient.REQ message M112,
MM1_read_reply_report.REQ message M113,
MM1_read_reply_report.RES message M114, and
MM1_read_reply_originator.REQ message M115 or according to more efficient reporting using report aggregation as described in more detail in conjunction with FIG. 3.

The described procedure can be applied to a single recipient MMS UA as illustrated in FIG. 1. However, improved efficiency is gained for multiple recipient MMS UAs. The operator of a mobile telecommunication system providing MMS may restrict MM multicast delivery to a number of recipient MMS UAs exceeding a threshold value. For a group of recipient MMS UAs that amount to be lower than the threshold value, unicast transmission of MM can be applied. For a number of recipient MMS UAs exceeding the threshold value, multicast MM transmission is applied for enhanced efficiency.

Figure 5:
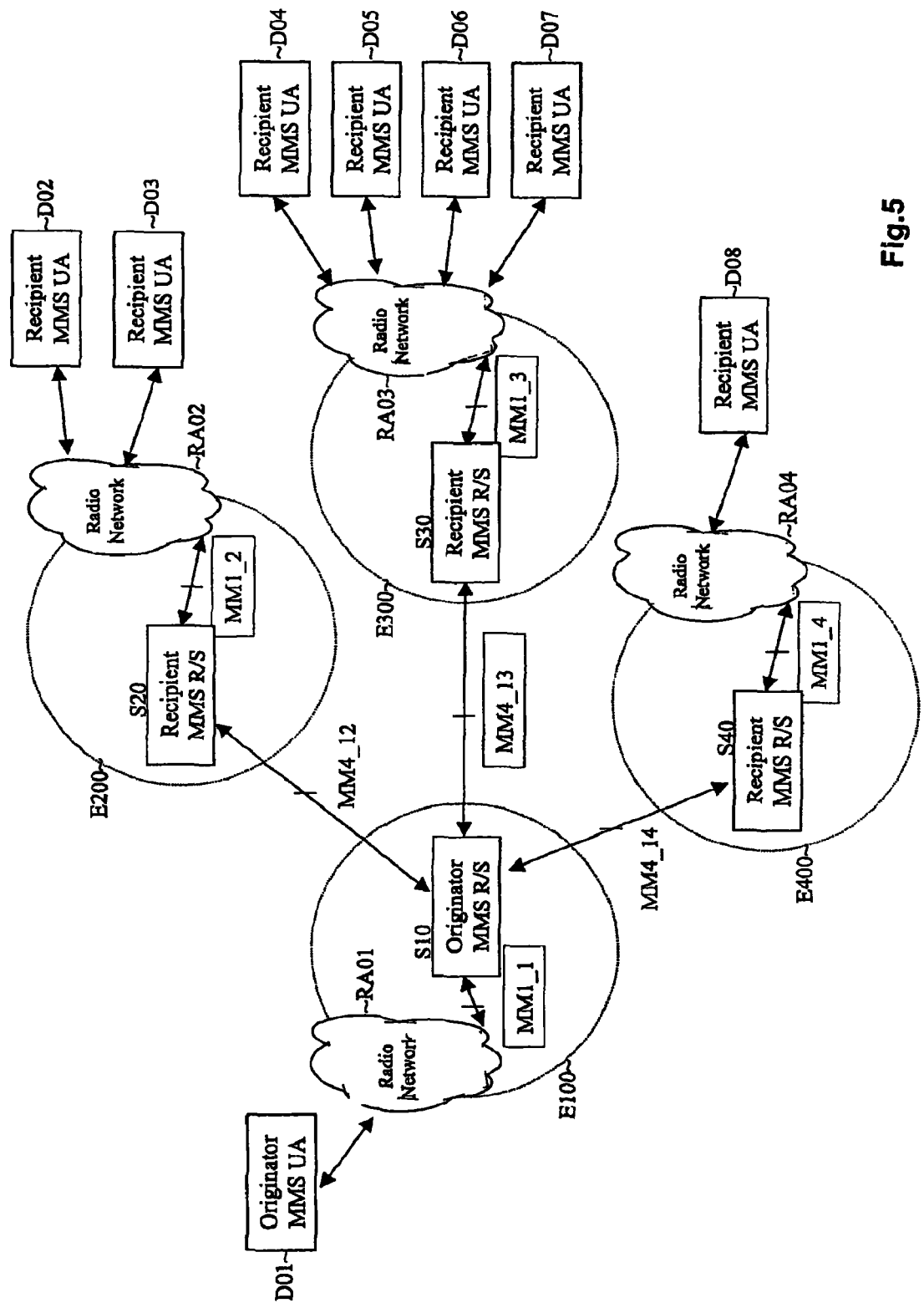
FIG. 5 shows an exemplary embodiment of a MMS system.

The transmission of the push object can be executed immediately after the transmission of the MM1_notification.REQ messages. Optionally, a trigger event may be used to send the MM to the recipient MMS UAs. A trigger event like a time may be preferably applied in cases of very large groups where it may take a while before all returned the acknowledgement of the notification message, i.e. by sending MM1_notification.RES messages. The time event may also be used to allow for different random time generations in the recipient MM UA UEs before returning the MM1_notification.RES message back to the recipient MMS R/S. Sending the push object at different times will reduce the load of the network especially in the case of a high density of recipient MMS UAs located in the same geographical area, e.g. connected to the same Radio Network Controller (RNC) or located in the same cell. The recipient MMS R/S can utilize a timer for taking into account times for the transmission of the MM1_notification.REQ messages and the preparation P200 for the reception of the push object by the recipient MMS UAs. The push object may be alternatively sent depending on the reception of MM1_notification.REQ messages. Successfully received MM1_notification.REQ messages can be indicated to the recipient MMS R/S 102 by the MM1_notificaton.RES messages. The recipient MMS R/S 102 may send the push object after a threshold value for the number of received MM1_notification.RES messages is exceeded. Also, more than one recipient MMS R/S may be involved for MMS multicast delivery to multiple recipient MMS UAs. An example for a system comprising more than one recipient MMS R/S is shown in FIG. 5.

A corresponding principle can be applied to Wireless Application Protocol (WAP) Push. In WAP Push, first a service indication is transmitted e.g. via SMS. The WAP over the air (OTA) specifications [see www.wapforum.org] defines so called "Service Indications" [see Service Indication, Version 31-July-2001, WAP-167-ServiceInd-20010731-a.pdf, available from www.wapforum.org], which contain a short message and an Universal Resource Identifier (URI) indicating the service. After reception, the mobile device may start the service indicated by the URI or postpone it to later, e.g. it can put it into the Push Inbox according to a WAP section of newer phones. The invention can be applied also to further store and forward solutions, e.g. SMS or Extended Messaging Services (EMS).

Parts of the group management or group resolution procedures can be implemented in a MMS Value Added Service Provider (VASP). A MMS VASP may be used to indicate to the originator MMS R/S whether a MM is to be sent to a large group or not. The originator MMS R/S may consider this information before distributing the MM.

FIG. 3 shows an example for a MMS with improved acknowledgement and report handling. A MM can be sent from an originator MMS UA 300 to multiple recipient MMS UAs either via unicast transmission according to state of the art or via the proposed MMS multicast delivery mechanism explained in conjunction with FIGS. 1 and 2. In FIG. 3, a unicast mechanism is depicted. For simplicity, only one recipient MMS R/S 302 and one recipient MMS UA 303 are depicted which exemplary stand for one or more recipient MMS R/Ss and one or more recipient MMS UAs, respectively. For MM to multiple recipient MMS UAs per recipient MMS R/S, the number of messages between the multiple MMS UAs and said recipient MMS R/S increases (e.g. messages M304-M308, M312). If multiple recipient MMS R/S are involved, the number of messages (e.g. messages M302, M303,M309,M310,M313,M314) between the originator MMS R/S 301 and the multiple recipient MMS R/S 302 increase with the number of involved MMS R/Ss. A corresponding increase occurs for processes P302,P303,P305 in case of multiple recipient MMS R/Ss.

A mechanism for controlling the delivery, reply charging and/or read-reply reports is provided to the originator MMS R/S 301 and/or the recipient MMS R/S 302 and preferably to the originator MMS UA 300 for indicating what kind and how the originator MMS UA 300 intends to receive one or more delivery, reply charging and/or read-reply reports. In the following, first the indication from the originator MMS UA 300 to the originator MMS R/S 301 is described. Then, the processing of acknowledgements and the aforementioned reports is explained.

In the case of multiple recipients UAs 303, the delivery report, reply-charging and read-reply indicators in the MM1_submit.REQ message M300 sent from the originator UA 300 to the originator MMS R/S 301 are extended from a simple yes/no or "read"/"deleted without being read" indicator to contain the following granularity as an example.

Information about individual recipient MMS UA required e.g. by indicating the addresses or identities of recipient MMS UAs to the originator MMS UA;

Information required which number or percentage of recipient MMS UAs have received the message within a certain time period;

Aggregated reports required;

Charging/billing information requested

Also combinations of indicators for requested reports can be used. Preferably, the user of the originator MMS UA can select the type of requested report, e.g. by selecting indicators indicating the request for an aggregated report supplemented with charging information, and send this request to the originator MMS R/S, e.g. via MM1_submit_REQ message M300. The selection may be achieved via an input/output unit. The increased granularity with which the originator MMS UA can indicate the preferred reception of delivery reports, read-replies and reply-charging provides improved end-user convenience and more efficient transport solutions.

The originator MMS R/S 301 may send the request as from the originating MMS UA 300 via the MM4_forward.REQ message M302 to the recipient MMS R/S 302. The originator MMS R/S 301 may also modify in process P301 the request of the originator MMS UA 300 and send the modified request to the recipient MMS R/S 302. In addition or alternatively, the originator MMS R/S can add one or more requests, e.g. for own statistical or charging/billing purposes and send the added requests to the recipient MMS R/S 302. Modified and/or added requests are preferably sent via MM4_forward.REQ message M302.

Examples of such modified or added requests include:

Information required which number or percentage of recipients have received the message within a certain time period.

Information about the physical location or the recipient network. The recipient network and/or physical location can be used for charging or statistical purposes. Both the actual distance to the one or more recipient networks or just the fact whether the recipient MMS R/S or UA is in the same network can be used for charging and statistical purposes.

The originator MMS R/S 301 can store the indicators and keep track of the reports that are returned in the following procedure and can notify the originator MMS UA 300 as requested. Furthermore, the originator MMS R/S 301 can keep track of the information for its own purposes. Examples of usage of the information in the originator MMS R/S 301 are new multi-user charging models where e.g. the charges for the originator MMS UA 300 depend on the number of recipients or the actual distribution speed. The aforementioned requests for controlling the delivery, reply-charging and/or read-reply reports can be propagated from the originator MMS UA 300 via the originator MMS R/S 301 to multiple recipient MMS R/Ss if recipient MMS UAs are connected to different recipient MMS R/Ss as e.g. shown in FIG. 5. In this case, the originator MMS R/S 301 can resolve the addresses of the recipient MMS UAs and distribute the recipient MMS UAs per recipient MMS R/S involved. Multiple MM4_forward.REQ messages can be used to send the MM and the aforementioned requests to the recipient MMS R/Ss with one MM4_forward.REQ message per involved recipient MMS R/S.

Upon reception of the propagated requests, the one or more recipient MMS R/Ss 302 can store information about the type of reporting that has been requested to be delivered to the originator MMS R/S 301 and/or the originator MMS UA 300. The one or more recipient MMS R/Ss 302 may add by process P302 requests or modify by process P302 the received requests, e.g. for own statistical purposes or charging/billing purposes, before notifying the one or more recipient MMS UAs 303 on the MM.

Delivery of the MM to a recipient MMS UA 303 can be achieved via MM1_notification.REQ message M304, the MM1_notification.RES message M305, the MM1_retriev.REQ message M305, and the MM1_retrieve.RES message M305 and with corresponding further messages in case the MM is to be delivered to multiple recipient MMS UAs. The delivery to one or more recipient MMS UAs may be achieved also via MMS multicast as explained in conjunction with FIGS. 1 and 2 which is e.g. preferably in case of large user groups per involved recipient MMS R/S.

Upon reception of the corresponding MM1_acknowledgement.REQ messages M308 from the recipient MMS UAs 303, the one or more recipient MMS R/S 302 can compile by process P303 the information according to the request from the originator MMS R/S 301. In the compilation, the acknowledgements, i.e. M1_acknowledgement.REQ messages M308 from the one or more recipient MMS UAs 303 can be registered. Further information can be deducted from the MM delivery process like the amount of recipient MMS UAs 303 from the number of MM1_notification.RES messages. M304 received by the one or more recipient MMS R/S 302. From the knowledge of the addresses of the recipient MMS UAs 303 it may be analyzed which of the notified recipient MMS UAs have received the notification and which not. It may also be verified which of the recipient MMS UAs have acknowledged the reception of the MM and which not. A corresponding analysis may be accomplished for the one or more read_reply_recipient.REQ messages M312 that indicate which recipient MMS UAs have read the MM.

In order to avoid that all delivery or read acknowledgements, i.e. the M1_acknowledgement.REQ messages M308 and the read_reply_recipient.REQ messages M312, respectively, received for this MM are reported in single MM4_delivery_report.REQ messages and MM4_read_reply_report.REQ messages to the originator MMS R/S 301, the one or more recipient MMS R/S 302 can aggregate the delivery or read acknowledgements into one or a few delivery or read-reply reports.

An aggregated report may comprise an amount or a percentage of the recipient MMS UAs that have acknowledged the delivery and/or the reading of the MM. The report may comprise alternatively or in addition, the amount of recipient MMS UAs that have not acknowledged the delivery and/or the reading. It may be helpful for the originator MMS UA 300 to get an indication of the address of the recipient MMS UAs that have or have not acknowledged the delivery or reading. Therefore, the addresses of the recipients MMS UAs may be linked to the aggregated information on the acknowledgements. In order to avoid long report response times, the recipient MMS R/S may collect the acknowledgements within a time interval. In this case, acknowledgements are registered and are compiled for the report if they match the time interval. Acknowledgements received not within this time interval may be discarded or may be used for a further report. A timer in or accessible by the recipient MMS R/S can be used for starting the time interval for the registration of acknowledgements and for stopping the registration according to the time interval. The start of the timer may be triggered by the MM1_notification.REQ messages like one or more messages M304 or messages M104,204,204n or by the multicast delivery (messages M106;M206 in FIGS. 1 and 2). For an aggregated MMS report, received acknowledgments for delivery and reading of a MM can be related to the MM by using a transaction identity which can be sent to the recipient MMS UAs in the MM1_notification.REQ message.

An example for an aggregated report comprising information on the delivery and read acknowledgement can be found in Table A. The report comprises an MM identity (MM ID). Furthermore, it specifies the amount of recipient MMS UAs addressed, i.e. the number of recipient MMS UAs the MM is to be delivered to in case of a group like a multicast group, the amount of recipient MMS UAs addressed is the number of the recipient MMS UAs in the group. As an alternative, the amount of recipient MMS UAs can specify the number of addresses selected by the user of the originator MMS UA the MM is to be delivered to. The amount of notified recipient MMS UAs can be determined by e.g. counting the number of MM1_notification.RES messages (e.g. messages M105, M205,M205n,M305) sent from the notified recipient MMS UAs. Alternatively, the number of MM1_notification.REQ messages (e.g. messages M104,M204,M204n,M304) to the recipient MMS UAs can be counted. Similarly, the amount of recipient MMS UAs that received the MM can be determined by counting the MM1_acknowledgement.REQ messages (e.g. messages M108,208,M208n,M308) from the recipient MMS UAs having received the MM or the corresponding messages for delivery (e.g. messages M106, M307). The amount of recipient MMS UAs that read the MM can be determined by e.g. counting the number of MM1_read_reply_recipient.REQ messages (e.g. M112, M312) sent from the recipient MMS UAs for confirmation of reading the MM.

TABLE A

Example for an aggregated report

| | |
|---|---|
| MM identity | MM ID |
| Amount of recipient MMS UAs addressed: | 10 |
| Amount of notified recipient MMS UAs: | 9 |
| Amount of recipient MMS UAs received the MM: | 8 |
| Amount of recipient MMS UAs read the MM: | 7 |
| Addresses of recipient MMS UAs not been notified: | 1 Address |
| Addresses of recipient UAs not acknowledged delivery of MM: | 2 Addresses |
| Address of recipient UAs not reading the MM | 3 Addresses |
| Delivery Time | 10:30 pm |
| Time interval for MM1_acknowledgement.REQ reception | 2 min |
| Time interval for MM1_read_reply_recipient.REQ reception | 4 min |

Using the aforementioned messages sent from the recipient MMS UAs for determining the respective amounts has the advantage that acknowledged, i.e. confirmed, information is used for report generation. Counting messages to the recipient MMS UAs has the advantage that a faster report generation may be achieved and that acknowledgement messages from the recipient MMS UAs may be skipped.

Correlating the individual acknowledgment messages with information related to the addresses of the recipient MMS UAs reveals information about the addresses of the recipient MMS UAs that missed the notification, that do not acknowledge the delivery of the MM, and/or that do not acknowledge reading of the MM.

Further information as the delivery time, the time interval for MM1_acknowledgement.REQ reception and the MM1_read_reply_recipient.REQ reception may be specified indicating to the reader of the report the respective acknowledgement message collection intervals.

TABLE B

Example for a compiled and aggregated report received by the originator MMS R/S from a first recipient MMS R/S.

| | |
|---|---|
| MMS R/S identity | ID1 |
| MM identity | MM ID |
| Amount of recipient MMS UAs addressed: | 10 |
| Address of recipient UAs not reading the MM | 3 Addresses |
| Delivery Time | 10:30 pm |

TABLE C

Example for a compiled and aggregated report received by the originator MMS R/S from a second recipient MMS R/S.

| | |
|---|---|
| MMS R/S identity | ID2 |
| MM identity | MM ID |
| Amount of recipient MMS UAs addressed: | 20 |
| Address of recipient UAs not reading the MM | 5 Addresses |
| Delivery Time | 10:30 pm |

TABLE D

Example for a compiled and aggregated report sent from the originator MMS R/S to the originator MMS UA.

| | |
|---|---|
| MM identity | MM ID |
| Amount of recipient MMS UAs addressed: | 30 |
| Address of recipient UAs not reading the MM | 8 Addresses |
| Delivery Time | 10:30 pm |

Information like a network identity may be added to a report for the case one or more of the recipient MMS R/S are located in a network different from that of the originator MMS R/S. The one or more recipient MMS R/S sends the aggregated reports to the originator MMS R/S, which preferably compiles and further aggregates the received reports before a delivery and/or read report is sent to the originator MMS UA 300. An example for a compiling and further aggregation can be found in tables B, C, and D.

From the tables B, C, and D it can be derived that reports can be more and more compressed by compiling and aggregation. Furthermore, selection and/or further processing of information in the reports is possible, e.g. it may not be necessary to provide the user of the originator MMS UA with the identities of the recipients MMS R/Ss involved. Therefore this information is skipped in the report for the originator MMS UA.

Aggregation of delivery and read-reply reports provides more adequate overviews of the corresponding status in case of multiple recipients of the same MM for both the originator MMS UA and Relay/Server. The aggregated control mechanisms enable more sophisticated group MMS charging, that can e.g. take the number of destinations that have received the MM and/or the number of destinations that have read the MM into account for the billing of the user that originated the MM since e.g. the originator and recipient MMS Relay/Server as can be made aware of the number of recipient MMS UAs receiving and/or reading the MM by analyzing appropriate entries in one or more reports according to the invention. Charging of the user of originator MMS UA may be executed by a further entity, e.g. a charging server, based on one or more of the reports according to the present invention. The originator MMS UA or the user of the originator MMS UA may analyze the information provided by the compiled and aggregated one or more reports according to the invention in order to e.g. initialize a transmission of the MM to those of the one or more UAs that missed, e.g. not received, the MM.

Aggregated reply-charging is a service where operators can distinguish themselves, since the originator MMS UA may be charged less because transmission resources are used efficiently, e.g. due to the reduced number of messages needed for reporting the reception and/or reading of MMs. In case of reply-charging the originator MMS UA pays for the reply message. In case of reply-messages, the recipient MMS R/S and the originator MMS R/S can compile these replies into a summary reply-message. In case e.g. only yes/no or ½ are valid answers, the originator or the recipient MMS R/S can compile a group reply message indicating yes and no or 1 and 2 with the numbers or percentage of recipient MMS UAs that have replied accordingly.

According to state of the art, for a delivery of a MM to a number of recipient MMS UAs up to the same number of delivery reports and up to the same number of read replies are possible if all addressed MMS UAs acknowledge the delivery and the reading of the MM. According to the present invention, only one report to the originator MMS UA is needed. For the case that the recipient MMS UAs are served by one recipient MMS R/S, only one report is needed from the recipient MMS R/S to the originator MMS R/S. If the addressed recipient MMS UAs belong to different recipient MMS R/Ss, each recipient MMS R/S can send a report to the originator MMS R/S thus slightly increasing the number of reports compared to a case where multiple recipient UAs are served by one recipient MMS R/S. In any case—independent from the number of recipient MMS UAs or the number of recipient MMS R/S involved, it can be ensured that the originator MMS UA receives only one aggregated report.

Owing to the flexibility of the proposed method, the originator MMS UA may be provided also with more than one report, e.g. the originator is provided with a first report stating the amount of recipient UAs that have received the MM within a certain time interval, e.g. several minutes after delivery of the MM, and later, e.g. after several hours after the delivery of the MM, with a second report indicating the amount of users that have read the MM.

An example illustrates the effectiveness of the proposed method: An originator sends a MM to 10.000 recipient UAs distributed to 3 recipient MMS R/S. According to state of the art up to 10.000 delivery reports and up to 10.000 read reports are generated and transferred from the recipient MMS R/Ss to the originator R/S which forwards up to 10.000 delivery reports and up to 10.000 read reports to the originator MMS UA. In total up to 40.000 report messages are sent. In addition, the acknowledgement messages for acknowledging the reception of the MM4_delivery_report.REQ messages and the MM4_read_reply_report.REQ messages, i.e. the MM4_delivery_report.RES messages and the MM4_read_reply report.RES messages, respectively, amount up to 10.000 for each type of acknowledgement message. In total, 60.000 messages have to be generated, transferred and processed by the entities involved according to the procedure described in 3GPP Technical Specification 23.140 V4.6.0 (2002-03). With the proposed method according to the present invention, at minimum 3 reports comprising delivery and read information from the recipient MMS R/S to the originator MMS R/S are needed and only one report to the originator MMS UA. In total, only 4 reports are needed. Adding 3 messages for acknowledging the reception of the reports, i.e. 3 acknowledgment messages sent from the originator MMS R/S to the 3 recipient MMS R/Ss, the total amount of messages is 7 and is thus much lower compared to 60.000 messages according to state of the art solution.

The number of messages needed according to prior art and the proposed invention for an arbitrary number of recipient MMS UAs and an arbitrary number of recipient MMS R/Ss can be calculated as followed:

| | |
|---|---|
| Number of recipient MMS UAs: | N |
| Number of recipient MMS R/S serving the N recipient MMS UAs: | M |
| Maximum number of messages according to prior art: | 6 × N |
| Minimum number of messages according to invention: | 2 × M + 1 |

For calculating the maximum number of messages according to prior art, it has been assumed that all addressed recipient MMS UAs have acknowledged the delivery and reading. Only messages MM4_delivery_report.REQ, MM4_delivery_report.RES, MM1_delivery_report.REQ, MM4_read_reply_report.REQ, MM4_read_reply_report.RES, and MM1_read_reply_originator.REQ have been considered for the calculation according to prior art.

For calculating the minimum number of messages according to the invention it has been assumed that delivery and read reply information are aggregated in one report, i.e. information comprised in messages M309 and M313 are merged into one report thus also combining messages M310 and M314. In addition, message M311 and M315 are merged for calculating the minimum number of messages according to the present invention. However, the combination of different reports ensures an improved effectiveness even in the case that only one recipient MMS UA is addressed. In any case, with the present invention the number of reports for delivery and reading can be decoupled from the number of recipient MMS UAs.

Figure 4:
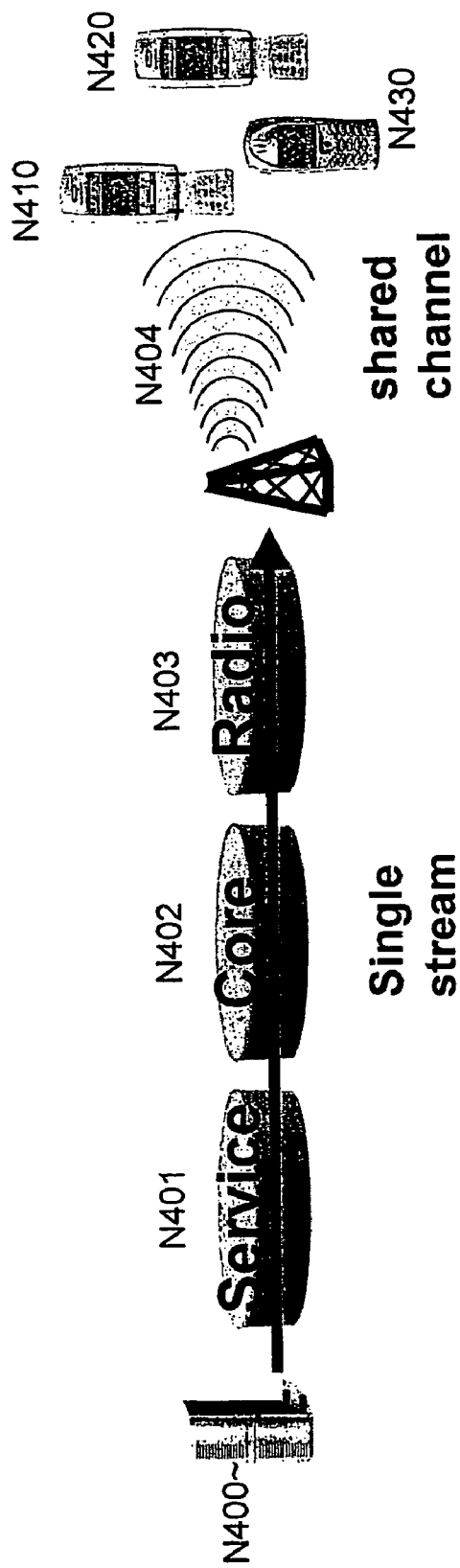
FIG. 4 shows a simplified system for providing multicast MM delivery.

FIG. 4 illustrates multicast MM delivery with exemplary devices and connections between the devices. A MM is sent from a first entity N400 via a service network N401, a core network N402, and a radio access network N403 efficiently via a shared channel to multiple recipient UAs N410, N420, N430, here depicted as mobile phones and smart phones. The first entity N400 can be an originator MMS UA, an originator MMS R/S, or a recipient MMS R/S. Using a single group address rather than multiple destination addresses enables an efficient and effective utilization especially of the scarce radio interface resources.

FIG. 5 shows an exemplary embodiment of a MMS system for executing the proposed invention with multiple recipient MMS UAs D02-D08 served by multiple recipient MMS R/Ss. S20, S30, S40. When the network elements are under the control of a single administration, sometimes the expression MMS environment (MMSE) is used for a MMS system, e.g. as indicated by the MMSE E100-E400. According to the present example, the multiple recipient MMS UAs D02-D08 are attached to the recipient MMS R/S S20, S30, S40 by radio access networks RA02;RA03;RA04. A MM can be sent from an originator MMS UA D01 via a first radio network RA01 to an originator MMS R/S S10. Preferred reports may be indicated by the originator MMS UA D01 to the originator MMS R/S S10. The MM can be distributed to the recipient MMS R/Ss S20-S40 and can be delivered via multicast to the recipient MMS UAs D02-D08. According to the invention, preferably multicast transmission is used for MM delivery. However, also a unicast transmission is possible, e.g. in case one or more of the components involved in the MM delivery is not capable of multicast or if the number of the recipient MMS UA per recipient MMS R/S is below a certain threshold number. Also a combination of multicast and unicast delivery is possible, e.g. multicast delivery for recipient MMS UAs D02-D07 and unicast delivery for recipient MMS UA D08.

Acknowledgements like MM1_acknowledgement.REQ and MM1_read_reply_recipient.REQ messages from the recipient MMS UAs D02-D08 are compiled and aggregated into reports by the recipient MMS R/Ss S20, S30, S40 and transmitted to the originator MMS R/S S10 that preferably further compiles and aggregates the reports from the recipient MMS R/S S20, S30, S40. Finally, a report on the MM can be sent to the originator MMS UA D01 according to the preferences of the user of the originator MMS UAs D01 or of the operator providing the MMS. Preferences by the operator can be set by using modify and add functionality.

In summary, both the operator of a telecommunication network providing MMS as well as the user of a MMS benefit from the enhanced efficiency of the proposed invention: High processing load of a recipient MMS R/S and huge messaging effort especially costly in a radio network can be minimized due to efficient multicast delivery and compilation and aggregation of reports. These kind of savings on network resources can directly decrease the cost for MMS helping to make MMS even more popular. Another important aspect is that aggregated reports are typically more user-friendly than the way of reporting by single messages as it is in state of the art. The invention can be adapted to be used in 2G, 2.5G, and 3G telecommunication systems e.g. according to the General Packet Radio Service (GPRS) and the Universal Mobile Telecommunication System (UMTS) standard.

The foregoing embodiments and the following glossary are to be considered illustrative, rather than restrictive of the invention, and those modifications which come within the meaning and range of equivalence of the claims are to be included therein.

| Glossary | |
|---|---|
| Entities: | |
| Originator MMS UA | 100, 300, D01 |
| Originator MMS R/S | 101, 301, S10 |
| Recipient MMS R/S | 102, 302, S20, S30, S40 |
| Recipient MMS UA | 103, 204, 20n, 20m, D02–D08 |
| Messages: | |
| MM1_submit.REQ message | M100, M300 |
| MM1_submit.RES message | M101, M301 |
| MM4_forward.REQ message | M102, M302 |
| MM4_forward.RES message | M103, M303 |
| MM1_notification.REQ message | M104, M204, M204n, M204m, M304 |
| MM1_notification.RES message | M105, M205, M205n, M205m, M305 |
| Multicast Data Delivery message | M106 |
| IGMP or MLD message | MC1, MC2, MC3 |
| MM1_retrieve.REQ message | M306 |
| MM1_retrieve.RES message | M307 |
| MM1_acknowledgement.REQ message | M108, 208, 208n, M308 |
| MM4_delivery_report.REQ message | M109, M309 |
| MM4_delivery_report.RES message | M110, M310 |
| MM1_delivery.report.REQ | M111, M311 |
| MM1_read_reply_recipient.REQ | M112, M312 |
| MM1_read_reply_report.REQ | M113, M313 |
| MM1_read_reply_report.RES | M114, M314 |
| MM1_read_reply_originator.REQ | M115, M315 |

The invention claimed is:

1. A method for efficient multicast transmission of a multimedia message from an originator user device to recipient user devices, the method comprising the steps of:

sending a first message from the originator user device to an originator server, the first message comprising the multimedia message and an indication of addresses of the recipient user devices;

identifying a recipient server associated to the recipient user devices based on the indication of the addresses;

sending the first message to the recipient server;

identifying the recipient user devices based on the indication of the addresses; and executing a multicast delivery of the multimedia message to the recipient user devices only when the number of recipient user devices exceeds a predetermined threshold, wherein, on execution, said multicast deliver is carried out by performing the following:

allocating a multicast address, sending the multicast address to the recipient user devices, embedding the multimedia message in an object suitable for a multicast transmission, preparing, by the recipient user devices, for a reception of the object by performing at least one of the following: adapting an encryption codec, adapting a bitrate, and reserving memory for storing or processing the multimedia message on the recipient user devices, joining, by the recipient user devices, multicast group according to the multicast address, and sending the object via the multicast transmission to the recipient user devices.

2. The method according to claim 1, wherein the recipient user devices receive, in conjunction with the multicast address, at least one item from a group comprising:

a description of an error protection scheme, a time window, a transaction key, charging information, an Uniform Resource Locator, an Uniform Resource Indicator, a logical name of a multicast group connected to the multicast address, a transmission start time, and a number of transmissions.

3. The method according to claim 1, wherein at least one of the originator server and the recipient server resolves the addresses of the recipient user devices from the indication of addresses.

4. The method according to claim 1, further comprising the steps of:

receiving from the originator server the multimedia message at the recipient server;

sending the multimedia message to the addressed recipient user devices associated with the recipient server;

receiving status messages, each comprising an indication of an individual transmission state of the multimedia message at corresponding one of the recipient user devices;

aggregating all indications from the received status messages into a report representing the transmission state of the multimedia message; and sending the report to the originator server.

5. The method according to claim 4, wherein at least one of the indications for the individual transmission state comprises at least one item from a group comprising:

an acknowledgement of a notification about the multimedia message, an acknowledgment of a delivery of the multimedia message, and an acknowledgment of a reading of the multimedia message.

6. The method according to claim 5, the indications being compiled according to a request originating from at least one entity from a group comprising:

the originator user device, the originator server, and the recipient server; and wherein the compiled indications are aggregated.

7. The method according to claim 5, wherein the originator server receives the multimedia message from the originator user device.

8. The method according to claim 7, wherein the indications are complied according to a request originating from at least one entity from a group comprising the originator user device, the originator server, and the recipient server, and wherein the compiled indications are aggregated; and the request is modifiable or one or more requests are addable to the request.

9. The method according to claim 5, wherein those of the status messages that are received within a time interval are used for the report.

10. The method according to claim 5, wherein one or more of the indications are relatable to one or more addresses of the recipient user devices and the report comprises the one or more addresses related to the transmission state.

11. The method according to claim 5, wherein the report is processed for statistical and/or charging purposes.

12. The method according to claim 5, wherein the recipient user devices are associated to more than one recipient server and the originator server sends the multimedia message to the more than one recipient server and receives more than one report each representing the transmission state of the multimedia message related to the respective recipient server, and the originator server aggregates the more than one reports into a further report representing the transmission state of the multimedia message.

13. The method according to claim 12, wherein the originator user device comprises an originator multimedia message service user agent.

14. The method according to claim 12, wherein the recipient user devices each comprises a recipient multimedia message service user agent.

15. The method according to claim 12, wherein the originator server is an originator multimedia message service relay server.

16. The method according to claim 12, wherein the recipient server is a recipient multimedia message service relay server.

17. A recipient server for efficient multicast transmission of a multimedia message from an originator user device to recipient user devices, the recipient server comprising:

a receiving unit for receiving messages;

a transmission unit for sending messages; and a processing unit for processing messages and information, wherein the recipient server is adapted to perform the following.

receive a first message from the originator user device comprising:

the multimedia message, and an indication of addresses of the recipient user devices;

identify the recipient user devices based on the indication of the addresses; and execute a multicast delivery of the multicast message to the recipient user devices only when the number of recipient user devices exceeds a predetermined threshold, wherein, upon execution of said multicast delivery, the recipient server is further adapted to perform the following:

allocate a multicast address, embed the multimedia message in an object suitable for a multicast transmission, send the multicast address in a notification message to the recipient user devices to enable the recipient user devices to join a multicast group and prepare for a reception of the object by performing at least one of the following: adapting an encryption codec, adapting a bitrate, and reserving memory for storing or processing the multimedia message on the recipient user devices, and send the object via the multicast transmission to the recipient user devices.

18. The recipient server according to claim 17, wherein the recipient server is adapted to send, in conjunction with the multicast address, at least one item from a group comprising: a description of an error protection scheme, a time window, a transaction key, charging information, an Uniform Resource Locator, an Uniform Resource indicator, a logical name of a multicast group connected to the multicast address, a transmission start time, and a number of transmissions.

19. The recipient server according to claim 17, wherein the recipient server is adapted to resolve the addresses of the recipient user devices from the indication of addresses.

20. The recipient server according to claim 17, wherein the recipient server is further adapted to perform the following:
receive status messages, each comprising an indication of an individual transmission state of the multimedia message at corresponding one of the recipient user devices;
aggregate all indications from received status messages into a report representing the transmission state of the multimedia message; and
send the report to the originator server.

21. The recipient server according to claim 20, wherein the recipient server is adapted to compile the indications according to a request originating from at least one entity from a group comprising an originator user device, the originator server, and the recipient server, and to aggregate the compiled indications.

22. The recipient server according to claim 20, wherein the recipient server is adapted to modify the request and to compile the indications according to the modified request or to add one or more requests and to compile the indications according to the added one or more requests.

23. The recipient server according to claim 20, wherein the recipient server is adapted to use those of the status messages for the report that are received within a time interval.

24. The recipient server according to claim 20, wherein the recipient server is adapted to relate one or more of the indications to one or more addresses of the recipient user devices and to relate the one or more addresses to the transmission state in the report.

25. The recipient server according to claim 20, wherein the recipient server is adapted to process the report for statistical and/or charging purposes.

26. The recipient server according to claim 20, wherein the recipient server is a recipient multimedia message service relay server.

27. A computer program embodied on a non-transitory computer readable medium of a processing unit of a recipient server, wherein the computer program, upon being executed by the processing unit, causes the processing unit to perform the following:

process a received first message comprising a multimedia message from an originator user device and an indication of addresses of the recipient user devices;
identify the recipient user devices based on the indication of the addresses;
execute a multicast delivery of the multimedia message to the recipient user devices only when the number of recipient user devices exceeds a predetermined threshold, wherein the processing unit executes said multicast delivery by:
allocating a multicast address,
embedding the multimedia message in an object suitable for a multicast transmission,
sending the multicast address in a notification message to the recipient user devices to enable the recipient user devices to join a multicast group prepare for a reception of the object by performing at least one of the following: adapting an encryption codec, adapting a bitrate, and reserving memory for storing or processing the multimedia message on the recipient user devices, and
sending the object via the multicast transmission to the recipient user devices.

28. The computer program according to claim 27, which, upon being executed by the processing unit, causes the processing unit to further perform the following:
send, in conjunction with the multicast address, at least one item from a group comprising: a description of an error protection scheme, a time window, a transaction key, charging information, a Uniform Resource Locator, a Uniform Resource Indicator, a logical name of a multicast group connected to the multicast address, a transmission start time, and a number of transmissions.

29. The computer program according to claim 27, which, upon being executed by the processing unit causes the processing unit to resolve the addresses of the recipient user devices from the indication of addresses.

30. The computer program according to claim 27, which, upon being executed by the processing unit, causes the processing unit to efficiently report a transmission state of the multimedia message addressed to the recipient user devices by:
processing received status messages, each comprising an indication of an individual transmission state of the multimedia message at corresponding one of the recipient user devices;
aggregating all indications from the received status messages into a report representing the transmission state of the multimedia message; and
sending the report to the originator server.

31. The computer program according to claim 30, which, upon being executed by the processing unit, causes the processing unit to compile the indications according to a request originating from at least one entity from a group comprising the originator user device, the originator server, and the recipient server, and to aggregate the compiled indications.

32. The computer program according to claim 30, which, upon being executed by the processing unit, causes the processing unit to modify the request and to compile the indications according to the modified request or to add one or more requests and to compile the indications according to the added one or more requests.

* * * * *

UNITED STATES PATENT AND TRADEMARK OFFICE
CERTIFICATE OF CORRECTION

PATENT NO.         : 8,401,032 B2
APPLICATION NO.    : 10/513532
DATED              : March 19, 2013
INVENTOR(S)        : Hundscheidt et al.

It is certified that error appears in the above-identified patent and that said Letters Patent is hereby corrected as shown below:

On Title Page 2, item (56), under "FOREIGN PATENT DOCUMENTS",
in Column 1, Line 3, delete "WO WO 0211398 2/2002".

On Title Page 2, item (56), under "FOREIGN PATENT DOCUMENTS",
in Column 2, Line 3, delete "WO WO 02063849 8/2002".

On Title Page 2, item (56), under "OTHER PUBLICATIONS",
in Column 2, Lines 1-5, delete ""Digital Cellular Telecommunications System (Phase 2+) ............... XP002224103.".

On Title Page 2, item (56), under "OTHER PUBLICATIONS", in Column 2,
Line 7, delete "US, US," and insert -- US, --, therefor.

In the Specification

In Column 4, Line 11, delete "the more" and insert -- more --, therefor at each occurrence throughout the patent.

In Column 6, Line 11, delete "multicast 30" and insert -- multicast --, therefor.

In Column 13, Line 3, delete "MM1_notificaton.RES" and insert -- MM1_notification.RES --, therefor.

In Column 13, Line 65, delete "UA" and insert -- MMS UA --, therefor.

In Column 14, Line 8, delete "requested" and insert -- requested. --, therefor.

In Column 15, Line 8, delete "MM1_retriev.REQ message M305," and
insert -- MM1_retrieve.REQ message M306, --, therefor.

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,401,032 B2

In Column 15, Line 9, delete "M305" and insert -- M307 --, therefor.

In Column 15, Line 22, delete "M1_acknowledgement.REQ" and insert -- MM1_acknowledgement.REQ --, therefor.

In Column 15, Line 26, delete "messages. M304" and insert -- messages M304 --, therefor.

In Column 15, Line 37, delete "M1_acknowledgement.REQ" and insert -- MM1_acknowledgement.REQ --, therefor.

In Column 16, Line 27, delete "M106, M307)." and insert -- M106, M306). --, therefor.

In Column 18, Line 51, delete "MM4_read_reply report.RES" and insert -- MM4_read_reply_report.RES --, therefor.

In Column 19, Line 49, delete "R/Ss." and insert -- R/Ss --, therefor.

In the Claims

In Column 21, Line 14, in Claim 1, delete "on execution," and insert -- upon execution, --, therefor.

In Column 21, Line 14, in Claim 1, delete "deliver" and insert -- delivery --, therefor.

In Column 21, Line 26, in Claim 1, delete "multicast" and insert -- a multicast --, therefor.

In Column 22, Line 7, in Claim 8, delete "wherein" and insert -- wherein: --, therefor.

In Column 22, Lines 51-52, in Claim 17, delete "following." and insert -- following: --, therefor.

In Column 23, Line 17, in Claim 18, delete "indicator," and insert -- Indicator, --, therefor.

In Column 24, Line 34, in Claim 29, delete "unit" and insert -- unit, --, therefor.